United States Patent
Verdigets et al.

(10) Patent No.: US 6,926,134 B2
(45) Date of Patent: Aug. 9, 2005

(54) PLASTIC CONVEYOR BELT MODULE WITH EMBEDDED FASTENERS

(75) Inventors: Christopher J. Verdigets, Ponchatoula, LA (US); Kevin W. Guernsey, Kenner, LA (US); David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/250,059

(22) Filed: Jun. 2, 2003

(65) Prior Publication Data

US 2004/0238329 A1 Dec. 2, 2004

(51) Int. Cl.[7] .............................................. B65G 29/00
(52) U.S. Cl. ........................... 198/867.15; 198/867.08; 198/803.14; 198/698
(58) Field of Search ................................ 198/851–853, 198/867.15, 867.01, 867.08, 803.11, 803.14, 698, 699

(56) References Cited

U.S. PATENT DOCUMENTS

| | | | | | |
|---|---|---|---|---|---|
| 3,085,676 | A | * | 4/1963 | Hinchcliffe | ................. 198/699 |
| 3,646,752 | A | * | 3/1972 | Kampfer | ..................... 198/852 |
| 4,069,911 | A | | 1/1978 | Ray | ............................ 198/627 |
| 4,582,193 | A | | 4/1986 | Larsson | |
| 4,611,710 | A | * | 9/1986 | Mitsufuji | .................... 198/853 |
| 4,832,183 | A | | 5/1989 | Lapeyre | ...................... 198/699 |
| 6,142,290 | A | * | 11/2000 | Tagliaferri | ................. 198/699 |
| 6,491,157 | B1 | * | 12/2002 | Kolling et al. | ......... 198/803.14 |

FOREIGN PATENT DOCUMENTS

| | | |
|---|---|---|
| DE | 10209155 A1 | 10/2002 |
| EP | 0172745 A1 | 2/1896 |
| EP | 1277676 A1 | 1/2003 |
| WO | WO 98/14396 | 4/1998 |

OTHER PUBLICATIONS

ISA/EP, Form PCT/ISA/206 Communication Relating to the Results of the Partial International SEarch os International Application No. PCT/US2004/013323, mailed Sep. 28, 2004.

\* cited by examiner

*Primary Examiner*—Joseph Valenza
(74) *Attorney, Agent, or Firm*—James T. Cronvich

(57) ABSTRACT

A plastic conveyor belt module having an embedded high-strength fastener for securely fastening an assortment of attachment elements. A fastener, such as a nut, or threaded insert, is press-fit into a countersunk hole that extends through the thickness of the module and opens onto top and bottom surfaces. Attachment hardware, such as a bolt or screw, extends from the attachment element into the embedded fastener to secure the attachment to the module.

24 Claims, 4 Drawing Sheets

PLASTIC CONVEYOR BELT MODULE WITH EMBEDDED FASTENERS

BACKGROUND OF INVENTION

The invention relates generally to power-driven conveyors and, more particularly, to modular plastic conveyor belts that include high-strength fasteners embedded in selected modules for securing a variety of attachment elements to the top or bottom surfaces of the belt.

Modular plastic conveyor belts are widely used in conveying applications. These belts are constructed of rows of belt modules linked end to end by hinge rods at hinge joints that allow the belt to articulate about a drive sprocket or drum. A belt is usually characterized by an outer conveying surface atop which articles are conveyed along a carryway portion of the conveying path and an interior drive surface that typically includes drive structure for engaging drive sprockets or drums.

Often it is necessary to attach special fixtures to modular plastic conveyor belts for special applications. One way these fixtures are attached to a module is by a bolt extending through a hole drilled through the module and held by a standard nut on the backside. But this method of attachment has shortcomings because, if the attachment hardware protrudes below the inner drive surface of the belt, it limits the placement of sprockets and supporting wearstrips under the belt. Another way to attach fixtures to a modular plastic belt is to mold special plastic fixtures that snap in place into structure in the belt modules. But the end user of a belt is limited to using those attachable fixtures available from the belt manufacturer, which may be expensive. Furthermore, plastic fixtures in plastic belts may not be strong enough to withstand the forces and torques associated with heavy loads or impacts.

Thus, there is a need for a modular plastic conveyor belt that can accept a variety of custom fixtures that may undergo a wide range of operating conditions.

SUMMARY OF INVENTION

That need and other needs are satisfied by a plastic conveyor belt module embodying features of the invention. The module comprises a plastic module body that extends in thickness from a top surface to a bottom surface. A hole extends through the thickness and opens onto the top and bottom surfaces. A high-strength fastener resides in the hole. An attachment element that extends from either the top or the bottom surface is secured in place by attachment hardware that extends from the attachment member and engages the fastener through the opening of the hole.

In another aspect of the invention, a plastic conveyor belt module that can be interconnected end to end with other such modules to form a conveyor belt comprises a plastic module body and a fastener embedded in the module body. The embedded faster is accessible from a top or a bottom surface of the module for attaching an attachment element to that surface.

In yet another aspect of the invention, a plastic conveyor belt module extends in thickness from a top surface to a bottom surface. A countersunk hole extends through the thickness of the module body and opens onto the top and bottom surfaces. A seat formed in the module body demarcates the interface between a wide region of the hole and a narrow region of the hole. The wide region lies just inward of one of the module surfaces. The narrow region lies further inward of the wide region. An internally threaded nut has a barrel and a wider flange at one end. The narrow region of the hole receives the barrel and the wide region receives the flange. An attachment element extends outward from the module surface distal from the flange end of the nut. A bolt or screw extends from the attachment element into the hole to engage the threaded nut. In this way, the attachment element is securely fastened to the module body.

BRIEF DESCRIPTION OF DRAWINGS

These and other features, aspects, and advantages of the invention are described in more detail in the following description, appended claims, and accompanying drawings in which:

DETAILED DESCRIPTION

Figure 1:
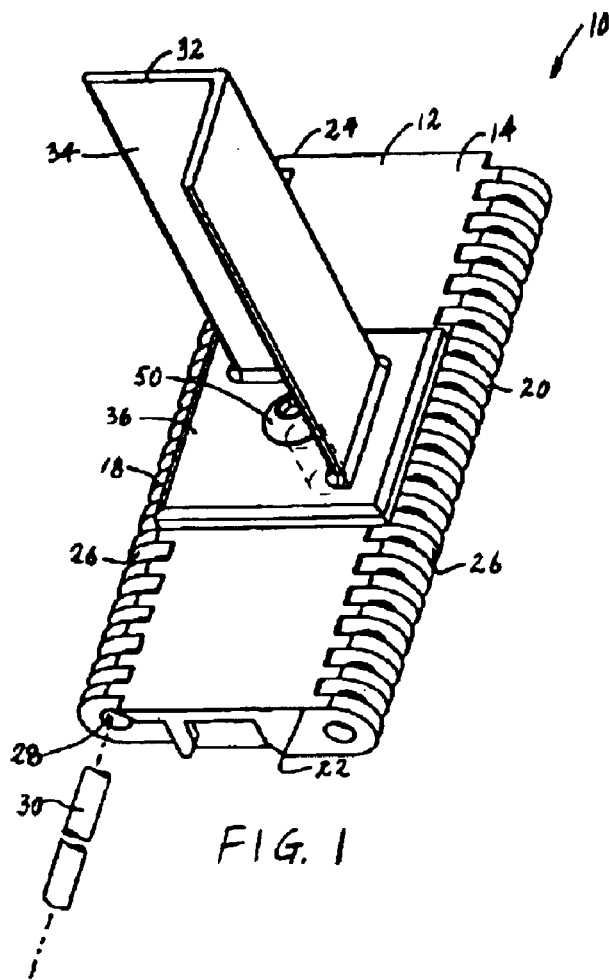
FIG. 1 is an isometric view of one version of a plastic conveyor belt module embodying features of the invention.

An exemplary version of a plastic conveyor belt module embodying features of the invention is shown in FIGS. 1–4. The module 10 comprises a plastic module body 12 that extends in thickness from a top surface 14, for example, an article-conveying surface, to a bottom surface 16. The module body extends longitudinally from a first end 18 to a second end 20 and transversely from a right edge 22 to a left edge 24. Hinge eyes 26 are spaced apart along each end. Aligned apertures 28 in the hinge eyes admit hinge rods 30. The hinge eyes along a first end of one row of one or more side-by-side belt modules interleave with the hinge eyes along a second end of an adjacent row of belt modules. A hinge rod inserted into the aligned apertures of the interleaved hinge eyes connects the rows together in a hinge joint. The belt constructed of a series of these interconnected belt rows is able to articulate at the hinge joints about a sprocket.

An attachment element 32, in this example, a section of angle iron 34 upstanding from a base 36 is mounted on the top surface of the module. The angle iron extends up from the top surface. A hole 38 extends through the thickness of the module body and has openings 40, 41 onto the top and bottom surfaces. A high-strength fastener 42, in the form of a threaded nut, is press-fit into the hole and retained in the module body. The high-strength fastener may be made of metal, such as stainless steel, or of some other material that is stronger than the plastic material out of which the module body is molded. For example, the fastener can be molded plastic reinforced with glass fibers, metal fibers, or carbon fibers. The nut has a threaded barrel 44 and a wider flange 46 at one end. The hole is preferably countersunk to accept the nut so that it is received into or is flush with the bottom surface of the module body. An interior seat 48 formed by machining or molding the countersunk hole receives the flange and forms a stable load-receiving surface for the embedded fastener. The seat demarcates the interface between narrow and wide regions of the hole. Attachment hardware 50, such as a standard bolt, extends through a through-hole 52 in the base of the attachment element through the top opening 40 into threaded engagement with the nut.

Clearly, the embedded high-strength fastener provides a sturdy attachment point on the module. Because the preferred fastener is a threaded nut, it readily accepts a wide variety of custom attachments for various applications. The attachment element is readily removable from the module in case it suffers damage or is to be replaced by a different kind of attachment element.

Figure 5:
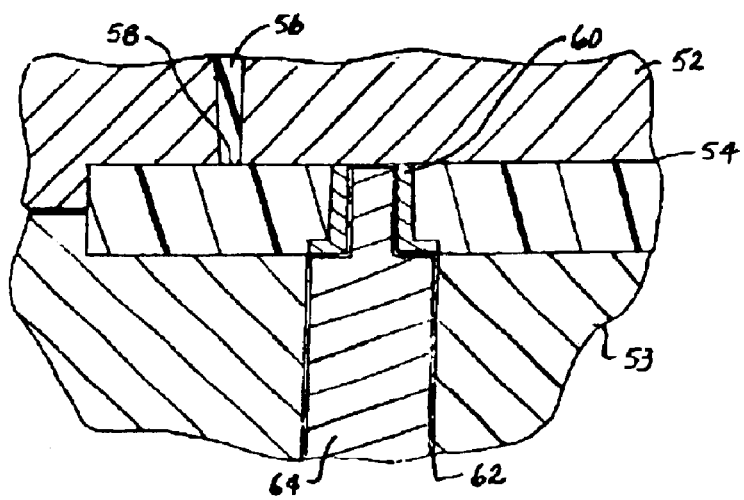
FIG. 5 is a partial cross section showing the manufacture of another version of a plastic belt module embodying features of the invention in which a fastener is molded into the module body.
Figure 2:
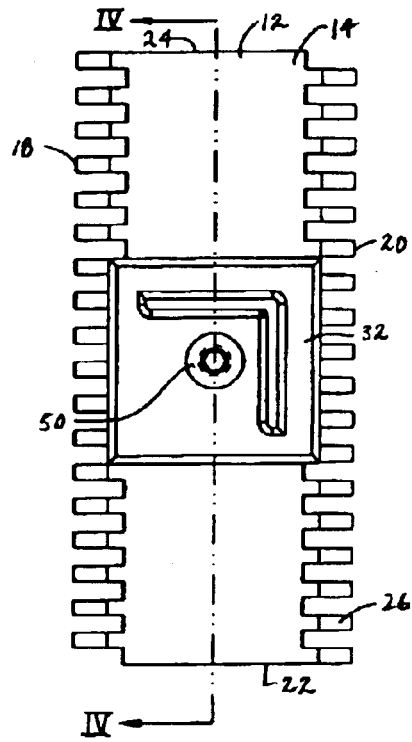
FIG. 2 is a top plan view of the module of FIG. 1.
Figure 3:
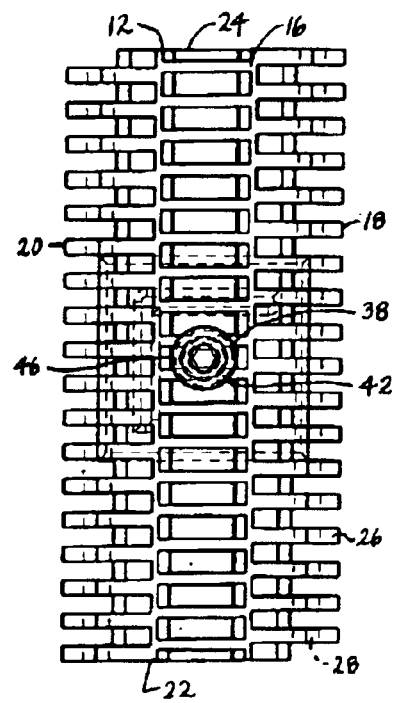
FIG. 3 is a bottom plan view of the module of FIG. 1.
Figure 4:
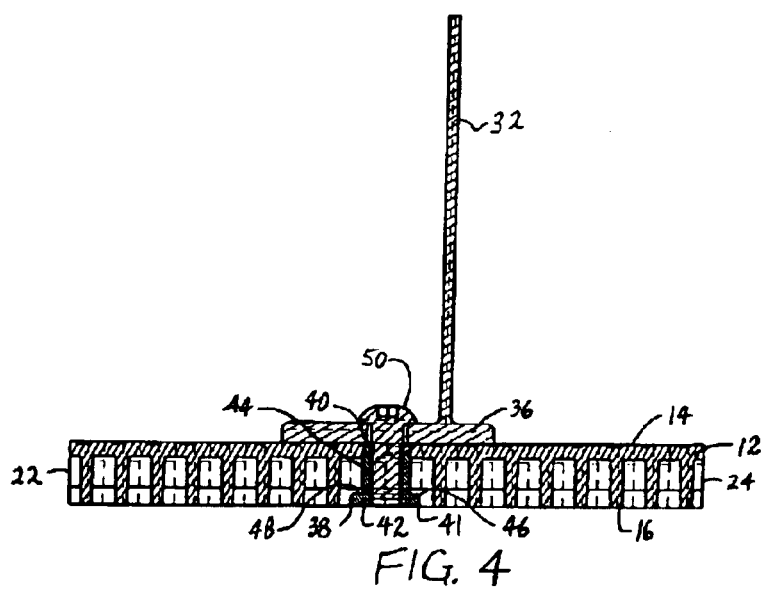
FIG. 4 is a cross section of the module of FIG. 1 taken along lines IV—IV of FIG. 2.

FIG. 5 shows in cross section another version of a plastic conveyor belt module. In this version, the fastener is molded into the module body when the module body is first formed. In the molding process, two mold halves 52, 53 define a cavity 54. A molten thermoplastic material is injected into the cavity via a runner 56 through a gate 58. The molten material, examples of which are polyethylene, polypropylene, acetal, nylon, and fiber-filled thermoplastic resins, surrounds a fastener 60 inserted into the cavity through an access port 62 and held in place on a mandrel 64 during the molding process. The thermoplastic material hardens around the fastener as it is subjected to elevated temperatures and pressures in the molding process. The result is a fastener integrally molded into and encapsulated by the module body in a form-fitting void.

Figure 6A:
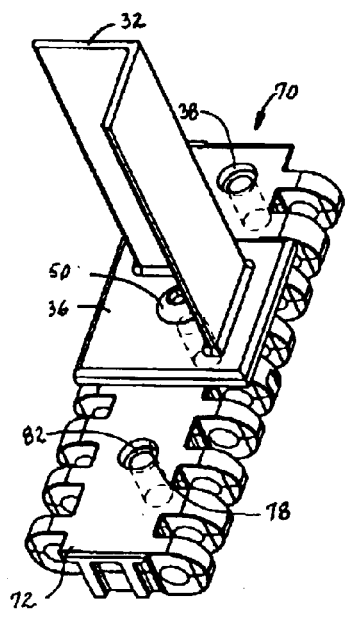
FIGS. 6A–6C are isometric, top plan, and cross section views of yet another version of plastic belt module embodying features of the invention in which multiple fasteners are embedded in a module body and in which the cross section of FIG. 6C is taken along lines VIC—VIC of FIG. 6B.
Figure 6B:
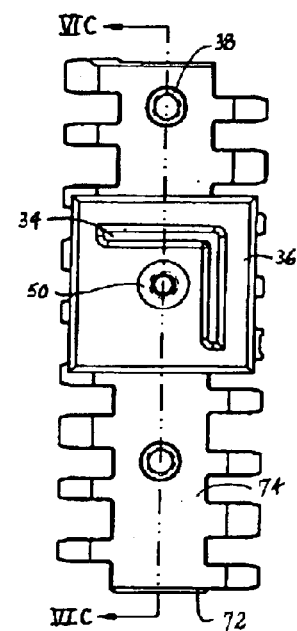
Figure 6C:
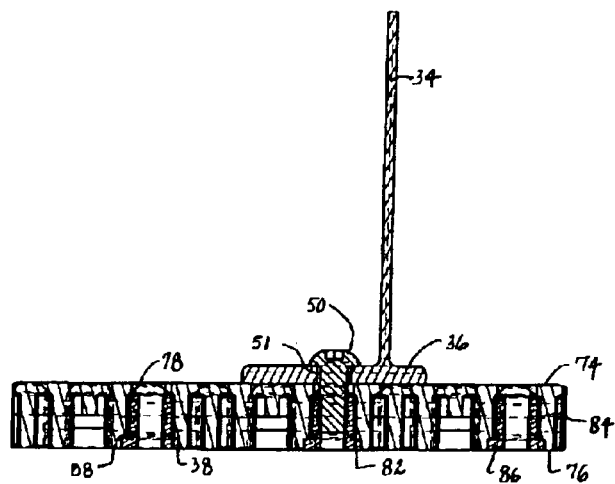

Yet another version of a module with an embedded fastener is shown in FIGS. 6A–6C. Like the module of FIGS. 1–4, the module 70 of FIGS. 6A–6C includes a plastic module body 72 that extends in thickness from a top surface 74 to a bottom surface 76. A plurality of holes 38 extend through the module body and open onto the top and bottom surfaces. A fastener, such as an internally threaded nut 82, resides snugly in the hole, which is preferably a countersunk hole like the hole in FIGS. 1–4. The nut includes a threaded main barrel 84 and a wider flange 86. In this version, as shown in FIGS. 6A and 6C, the nut is recessed into the hole inward from the top surface across a space 78. The flange of the nut is shown flush with the bottom surface of the module and resting against an interior seat 88. An attachment element 32 is attached to the embedded fastener by a bolt 50 through a through-hole 51 in the base 36 of the attachment element. The bolt screws into the threaded fastener. Other attachment elements can be similarly fastened to the module at the positions of the other fasteners.

Figure 7:
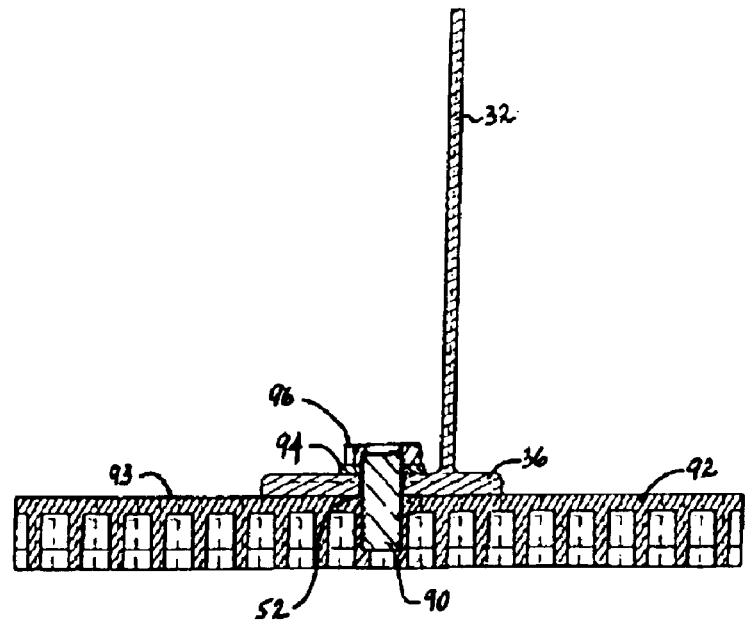
FIG. 7 is a cross section of another version of a plastic conveyor belt module embodying features of the invention in which the fastener is an embedded threaded rod.

Another version of fastener is shown in FIG. 7. A threaded rod 90 is molded into the module body 92 and protrudes above its top surface 93, in this example. The through-hole 52 in the base 36 of the attachment element 32 receives the protruding end of the threaded rod. Attachment hardware, such as a lock washer 94 and a nut 96 fasten the attachment to the threaded rod. An embedded bolt could serve as an alternative to the headless threaded rod.

Figure 8:
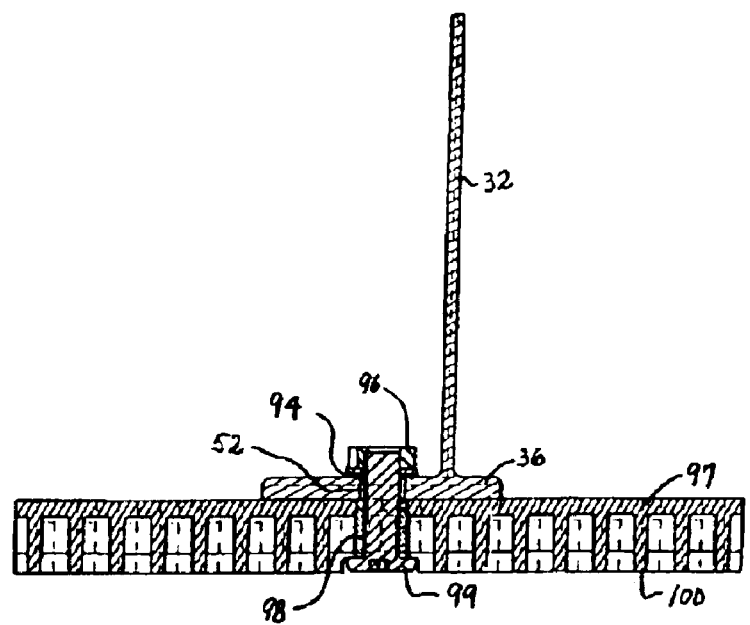
FIG. 8 is a cross section of another version of a plastic conveyor belt module embodying features of the invention in which the fastener is an embedded sleeve admitting a bolt.

Still another version is shown in FIG. 8. In this version, a reinforcing sleeve or ferrule 98 embedded in the module body 97 forms a fastener element. A bolt 99 extends from the bottom surface 100 of the module through the sleeve and the through-hole 52 in the base 36 of the attachment element 32. Attachment hardware, such as a lock washer 94 and a nut 96 on the bolt secure the attachment element to the module body.

The invention has been described with reference to a couple of preferred versions, but other versions are possible. Although the drawings show a nut and hole arrangement for fastening an attachment element to the top surface of a belt module, the hole and nut could be reversed to fasten an attachment element to the bottom surface. As another example, the nut described in detail need not be flush with both the top and the bottom surfaces, but could be recessed. The hole could be a blind hole opening onto only one of the module surfaces. As these few examples suggest, the scope of the claims is not meant to be limited to the descriptions of the preferred versions.

What is claimed is:

1. A plastic conveyor belt module suitable for accepting a variety of attachments, the module comprising;
    a plastic module body extending longitudinally from a first end to a second end and in thickness from an article-conveying top surface to a bottom surface and forming a hole extending through the thickness with openings onto the top surface and the bottom surface and having hinge eyes spaced apart along the first and second ends;
    a high-strength fastener resident in the hole;
    a removable attachment element extending from the top or the bottom surface; and
    attachment hardware extending from the attachment element and engaging the fastener through the opening on the top or bottom surface to removably secure the attachment element to the module.

2. A plastic conveyor belt module as in claim 1 wherein the fastener is an internally threaded nut.

3. A plastic conveyor belt module as in claim 1 wherein the fastener resides entirely in the hole.

4. A plastic conveyor belt module as in claim 1 wherein the fastener is press-fit in the hole.

5. A plastic conveyor belt module as in claim 1 wherein the module body is molded around the fastener.

6. A plastic conveyor belt module as in claim 1 wherein the fastener is flush with at least one of the top and bottom surfaces.

7. A plastic conveyor belt module as in claim 1 wherein the module body includes an internal seat demarcating the interface between a first wide region of the hole inward of one of the top and bottom surfaces and a second narrow region of the hole inward of the first wide region and wherein the fastener includes a flange that sits on the seat.

8. A plastic conveyor belt module as in claim 1 wherein the fastener is an internally threaded nut embedded in the hole and the attachment hardware includes a threaded bolt or screw extending through the attachment element into engagement with the threaded nut.

9. A plastic conveyor belt module as in claim 1 wherein the fastener includes a flange at an end of the fastener distal from the attachment element.

10. A plastic conveyor belt module suitable for accepting a variety of attachments and capable of being interconnected end to end with other such modules to form a modular conveyor belt, the module comprising:
    a plastic module body extending longitudinally from a first end to a second end and in thickness from a top surface to a bottom surface and having hinge eyes spaced apart along the first and second ends for interleaving with the hinge eyes of longitudinally adjacent end-to-end modules; and a fastener embedded in the plastic module body and accessible from at least one of the top and bottom surfaces for removably attaching an attachment element to that surface;

wherein the plastic module body forms a cavity opening onto both the top and bottom surfaces and in which the fastener resides.

11. A plastic conveyor belt module as in claim 10 further comprising a metal attachment element.

12. A plastic conveyor belt module suitable for accepting a variety of attachments and capable of being interconnected end to end with other such modules to form a modular conveyor belt, the module comprising:

a plastic module body extending longitudinally from a first end to a second end and in thickness from a top surface to a bottom surface and having hinge eyes spaced apart along the first and second ends for interleaving with the hinge eyes of longitudinally adjacent end-to-end modules; and a fastener embedded in the plastic module body and accessible from at least one of the top and bottom surfaces for removably attaching an attachment element to that surface;

wherein the plastic module body is molded around the fastener.

13. A plastic conveyor belt module as in claim 12 wherein the fastener is flush with at least one of the top and bottom surfaces.

14. A plastic conveyor belt module as in claim 12 wherein the fastener protrudes from at least one of the top and the bottom surfaces of the module body.

15. A plastic conveyor belt module as in claim 10 wherein the fastener is press-fit in the cavity.

16. A plastic conveyor belt module as in claim 10 wherein the fastener is flush with at least one of the top and bottom surfaces.

17. A plastic conveyor belt module as in claim 10 further comprising an attachment element on one of the top and bottom surfaces and fastened to the fastener, wherein the fastener includes a flange at an end of the fastener distal from the attachment element.

18. A plastic conveyor belt module as in claim 10 wherein the cavity is a countersunk hole and wherein the fastener includes a barrel and a wider flange that fits in the countersunk region of the hole.

19. A plastic conveyor belt module as in claim 12 wherein the fastener is a threaded rod.

20. A plastic conveyor belt module as in claim 10 wherein the fastener protrudes from at least one of the top and bottom surfaces of the module body.

21. A plastic conveyor belt module as in claim 10 wherein the fastener includes a sleeve embedded in the module body.

22. A plastic conveyor belt module as in claim 12 wherein the fastener is made of metal.

23. A plastic conveyor belt module as in claim 12 wherein the fastener is made of a plastic material reinforced with fibers.

24. A plastic conveyor belt module comprising:

a plastic module body extending longitudinally from a first end to a second end and in thickness from a top surface to a bottom surface and forming a countersunk hole extending through the thickness with openings onto the top surface and the bottom surface, the module body further including hinge eyes spaced apart along the first and second ends and a seat demarcating the interface between a wide region of the countersunk hole inward of one of the top and bottom surfaces and a narrow region of the hole inward of the wide region;

an internally threaded nut having a barrel and a wider flange at one end, the barrel received in the narrow region of the hole and the flange received in the wide region of the hole;

a removable attachment element extending outward from the one of the top and bottom surfaces distal from the flange end of the nut; and a bolt or screw extending from the attachment element into the hole into engagement with the threaded nut to removably fasten the attachment element to the module body.

* * * * *